W. M. HARWELL.
WEEDING HOE.
APPLICATION FILED SEPT. 27, 1915.
1,181,308.
Patented May 2, 1916.
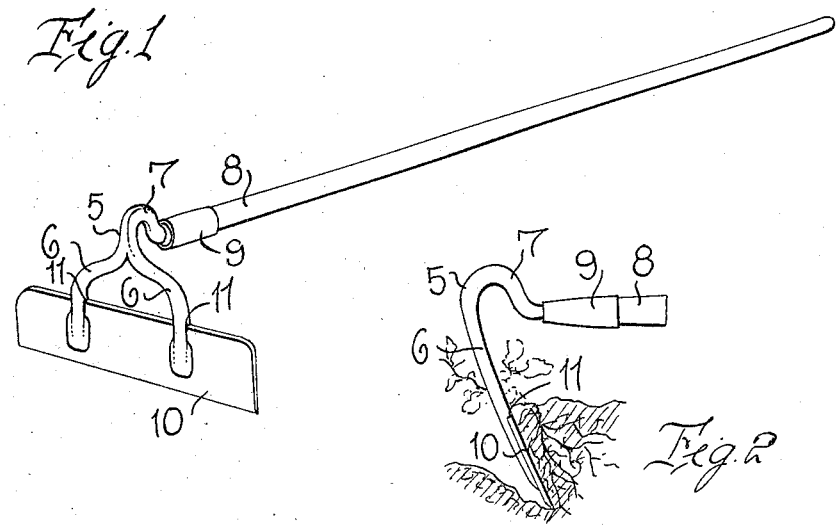
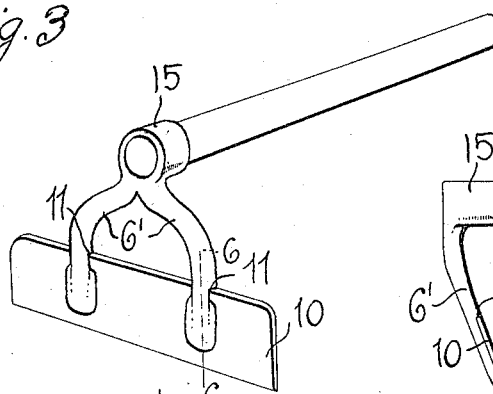
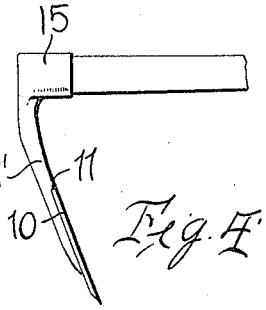
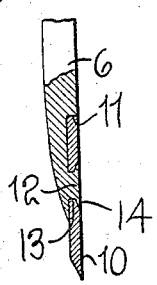
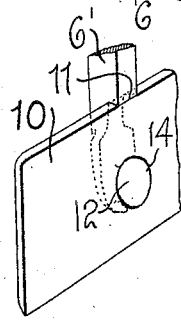
Inventor
WILLIAM M. HARWELL
By Watson E. Coleman
Attorney

UNITED STATES PATENT OFFICE.

WILLIAM MILTON HARWELL, OF COLUMBIANA, ALABAMA.

WEEDING-HOE.

1,181,308.  Specification of Letters Patent.  Patented May 2, 1916.

Application filed September 27, 1915. Serial No. 52,916.

*To all whom it may concern:*

Be it known that I, WILLIAM M. HARWELL, a citizen of the United States, residing at Columbiana, in the county of Shelby and State of Alabama, have invented certain new and useful Improvements in Weeding-Hoes, of which the following is a specification, reference being had to the accompanying drawings.

This invention relates to an improved weeding hoe and has for its primary object to provide a very simple, as well as durably constructed implement of this character which may be used with facility in weeding gardens or plant rows.

The invention has for another and more particular object to provide a head of suitable construction connected to a suitable handle and improved means for securing the weeding blade to said head.

The invention has for another important object to provide a head for connecting the blade of the weeder to the handle, said head consisting of spaced diverging arms disposed above the blade, whereby the weeds and earth may pass over the upper edge of the blade as it is drawn through the ground.

With the above and other objects in view, my invention consists in the novel features of construction, combination, and arrangement of parts to be hereinafter more fully described, claimed, and illustrated in the accompanying drawing, in which, Figure 1 is a perspective view illustrating one embodiment of my improved weeder; Fig. 2 is a side elevation thereof showing the device in actual use; Fig. 3 is a perspective view illustrating a slightly modified construction; Fig. 4 is a side elevation of said modification; Fig. 5 is an enlarged fragmentary perspective view illustrating the manner of attaching the weeder blade to the arms of the head; and Fig. 6 is an enlarged detail vertical section.

Referring in detail to the drawing, and more particularly to Figs. 1 and 2 thereof, 5 designates generally the head member which carries the weeder blade. As shown, this head member consists of diverging arms 6 which are integrally connected together at one of their ends and from such integral connection, the metal rod or bar is upwardly extended and curved, as at 7 into substantially semi-circular form. The rod is extended from this curve 7 laterally in the form of a tapering tang for insertion into one end of a suitable wooden handle shown at 8, said handle being provided with the usual metal ferrule 9 in order to prevent splitting thereof.

Referring now more particularly to Figs. 5 and 6 of the drawing, it will be observed that each of the arms 6 at its extremity is of rectangular form and one side thereof is cut-away or recessed to receive the upper portion of the hoe blade 10. This recess results in the provision of a shoulder 11 with which the upper edge of the hoe blade abuts or contacts. The reduced extremity of the arm 6 is flattened and formed upon its recessed face with a stud 12. This stud is adapted for engagement through an opening 13 in the hoe blade 10 adjacent the end thereof and the end of the stud is then hammered and swaged outwardly, as at 14 so that its end face will be disposed in the same plane as the face of the hoe blade. In this manner, it will be seen that the hoe blade is securely and permanently fastened upon the arms of the head and as the upper edge of the blade abuts squarely against the shoulders 11, liability of the studs 12 being broken off by the impact of the cutting edge of the blade with the ground, is obviated.

In Figs. 3 and 4 of the drawing, I have shown a slightly modified construction wherein the arms 6' of the head at their integrally connected ends are formed with a laterally projecting, slightly tapered sleeve 15 in which the larger end of the tapering cylindrical handle member is engaged. The hoe blade is fastened upon the arms of the head in the manner above described. Either construction of the head member for the hoe is extremely strong and durable and may be produced at relatively small cost.

From the foregoing description taken in connection with the accompanying drawing, it will be seen that I have produced a very simple, as well as serviceable and convenient weeding hoe in which the hoe blade is securely braced upon opposite sides of its central portion, so that the hoe may be handled with great facility. In Fig. 2, it will be observed that the blade is driven into the ground adjacent to the weed and the operator then pulls the same to loosen the earth, which together with the weed will pass over the upper edge of the blade between the spaced arms 6 of the head. Thus the head of the weeder will always be clear of obstructions. It is apparent, of course, that the weeding blade may be provided in various sizes and the manner of attachment of the handle to the head member also varied in many respects as may be found desirable.

While I have, however, disclosed the preferred construction and arrangement of the several features of the device, it is further to be understood that the same is susceptible of considerable modification therein and I therefore reserve the privilege of adopting all such legitimate changes as may be fairly embodied within the spirit and scope of the invention, as claimed.

Having thus described this invention, what I desire to claim as new and secure by Letters Patent, is:—

A weeding hoe including a head member consisting of spaced parallel arms having recesses in their corresponding faces at one of their ends, and integral rivets projecting from said recessed faces, said recesses providing shoulders upon said arms, a hoe blade adapted to be arranged in said recesses and abutting at its upper edge against the shoulders, the working face of the blade being entirely unobstructed, said blade being provided with openings to receive the rivet projections, whereby the blade is permanently fixed upon said arms, the other ends of said arms being inwardly and upwardly curved toward each other and integrally connected at a point in spaced relation to the blade and in the vertical plane thereof, the head being formed at the juncture of said arms with means for attachment to a suitable handle.

In testimony whereof I hereunto affix my signature in the presence of two witnesses.

WILLIAM MILTON HARWELL.

Witnesses:
    JAMES M. BALDWIN,
    GUY H. DICK.

Copies of this patent may be obtained for five cents each, by addressing the "Commissioner of Patents, Washington, D. C."